US012045751B2

(12) United States Patent
Martinnson et al.

(10) Patent No.: US 12,045,751 B2
(45) Date of Patent: Jul. 23, 2024

(54) GENERATING A FORECAST BASED ON MULTIPLE TIME DIMENSIONS AND MACHINE LEARNING TECHNIQUES

(71) Applicant: Accenture Global Solutions Limited, Dublin (IE)

(72) Inventors: Marcus Martinnson, Barcelona (ES); Pau Ferrer Puig, Barcelona (ES)

(73) Assignee: Accenture Global Solutions Limited, Dublin (IE)

( * ) Notice: Subject to any disclaimer, the term of this patent is extended or adjusted under 35 U.S.C. 154(b) by 193 days.

(21) Appl. No.: 17/448,987

(22) Filed: Sep. 27, 2021

(65) Prior Publication Data

US 2022/0108246 A1 Apr. 7, 2022

(30) Foreign Application Priority Data

Oct. 1, 2020 (EP) .................................... 20382871

(51) Int. Cl.
  *G06Q 10/06* (2023.01)
  *G06F 18/23213* (2023.01)
  *G06N 20/20* (2019.01)
  *G06Q 10/0631* (2023.01)

(52) U.S. Cl.
  CPC . *G06Q 10/06315* (2013.01); *G06F 18/23213* (2023.01); *G06N 20/20* (2019.01)

(58) Field of Classification Search
  CPC .................................................... G06Q 10/06
  USPC ......................................................... 705/7.25
  See application file for complete search history.

(56) References Cited

U.S. PATENT DOCUMENTS

| 11,250,345 | B1* | 2/2022 | Rabbani | G06F 16/353 |
| 11,276,112 | B2* | 3/2022 | Wu | G06Q 40/02 |
| 2016/0104163 | A1* | 4/2016 | Aquino | G06Q 20/4016 705/44 |
| 2018/0314952 | A1* | 11/2018 | Kurian | G06Q 10/0637 |
| 2018/0350006 | A1* | 12/2018 | Agrawal | G06F 7/026 |
| 2019/0295087 | A1* | 9/2019 | Jia | H04L 67/535 |
| 2020/0098055 | A1 | 3/2020 | O'Hara et al. | |
| 2020/0257561 | A1 | 8/2020 | Ortiz et al. | |
| 2022/0020049 | A1* | 1/2022 | Rao | G06N 20/00 |

OTHER PUBLICATIONS

Extended European Search Report for Application No. EP20382871.0, mailed on Mar. 12, 2021, 9 pages.

* cited by examiner

*Primary Examiner* — Nga B Nguyen
(74) *Attorney, Agent, or Firm* — Polsinelli PC

(57) ABSTRACT

A device may configure a plurality of time dimensions of a forecast model to forecast transactions. The device may identify, using the forecast model and transaction information associated with forecasting a transaction, historical transaction data that includes timing information associated with executions of a set of previous transactions that are associated with the transaction. The device may generate, using the forecast model and the plurality of time dimensions, a plurality of clusters associated with the set of previous transactions. The device may determine, using the forecast model, similarity scores for the plurality of clusters that correspond to individual probabilities that the set of previous transactions occurred according to the plurality of time dimensions. The device may select, based on the similarity scores, a time dimension for a forecast of the transaction. The device may generate the forecast of the transaction based on the time dimension.

24 Claims, 8 Drawing Sheets

GENERATING A FORECAST BASED ON MULTIPLE TIME DIMENSIONS AND MACHINE LEARNING TECHNIQUES

CROSS-REFERENCE TO RELATED APPLICATION

This application claims priority to European Patent Application No. 20382871.0 entitled "GENERATING A FORECAST BASED ON MULTIPLE TIME DIMENSIONS AND MACHINE LEARNING TECHNIQUES," filed on Oct. 1, 2020. The entire content of which is expressly incorporated herein by reference.

BACKGROUND

One or more machine learning models may be utilized to generate a prediction concerning one or more parameters. In some cases, a combination of one or more other machine learning models may be utilized to increase an accuracy of the prediction.

SUMMARY

According to some implementations, a method may include configuring, by a device, a plurality of time dimensions of a forecast model to forecast transactions; training, by the device, the forecast model based on historical data associated with a plurality of previous transactions; receiving, by the device, transaction information associated with forecasting a transaction; identifying, by the device and using the forecast model and the transaction information, historical transaction data in the historical data that is associated with the transaction, wherein the historical transaction data includes timing information associated with executions of a set of previous transactions, of the plurality of previous transactions, that are associated with the transaction; generating, by the device and using the forecast model and the plurality of time dimensions, a plurality of clusters associated with the set of previous transactions based on the timing information; determining, by the device and using the forecast model, similarity scores for the plurality of clusters that correspond to individual probabilities that the set of previous transactions occurred according to the plurality of time dimensions; selecting, by the device and based on the similarity scores, a time dimension, of the plurality of time dimensions, for a forecast of the transaction, wherein the time dimension is associated with a highest probability that the set of previous transactions occurred according to the time dimension; generating, by the device, the forecast of the transaction based on the time dimension; and performing, by the device, an action associated with the forecast.

According to some implementations, a device may include one or more memories and one or more processors. In some implementations, the one or more processors are communicatively coupled to the one or more memories. The one or more processors may be configured to: receive transaction information associated with forecasting a transaction; determine, based on the transaction information, a forecast period associated with the transaction; select, based on the forecast period and from a plurality of time dimensions, a set of time dimensions for forecasting timing of the transaction; identify historical transaction data associated with a set of previous transactions that are associated with the transaction; generate, according to the set of time dimensions, a plurality of clusters associated with the set of previous transactions based on timing of the set of previous transactions in the historical transaction data; perform a similarity analysis on one or more of the plurality of clusters; select, based on performing the similarity analysis, a time dimension from the set of time dimensions, wherein the similarity analysis indicates that a cluster associated with the time dimension indicates that the time dimension provides a highest probability of being accurate relative to other time dimensions of the set of time dimensions; determine, based on the time dimension, a time period of the transaction; and perform an action associated with the time period.

According to some implementations, a non-transitory computer-readable medium may store one or more instructions. The one or more instructions, when executed by one or more processors of a device, may cause the one or more processors to: configure a forecast model to utilize a plurality of time dimensions to forecast transactions; train the forecast model based on the plurality of time dimensions and historical data associated with a plurality of previous transactions; evaluate a plurality of clusters associated with the forecast model forecasting a particular transaction according to the plurality of time dimensions, wherein the transaction is associated with a particular characteristic and wherein the transaction is associated with a set of previous transactions of the plurality of previous transactions that are associated with the characteristic; select an optimum time dimension, from the plurality of time dimensions, based on a comparison of respective cluster scores of the plurality of time dimensions that are relative to evaluating the plurality of clusters; and perform an action associated with the forecast model forecasting timing of the transaction according to the optimum time dimension.

According to some implementations, a method may include receiving, by a device, a first set of historical transaction data; receiving, by the device, a second set of historical transaction data; obtaining, by the device, governing parameter data, the governing parameter data including two or more categories of data; obtaining, by the device, a plurality of machine learning models; for each category of transaction data, determining, by the device, a respective forecasted category data using each of the plurality of machine learning models based on the first set of historical transaction data and the second set of historical transaction data; for each category of transaction data, comparing, by the device, each respective forecasted category data relative to the historical transaction data; for each category of transaction data, selecting, by the device, an optimum forecasted category data based on the comparisons; and determining, by the device, an overall forecasted data based on an aggregation of the optimum forecasted category data for each of the categories of transaction data.

DETAILED DESCRIPTION

Figure 1A:
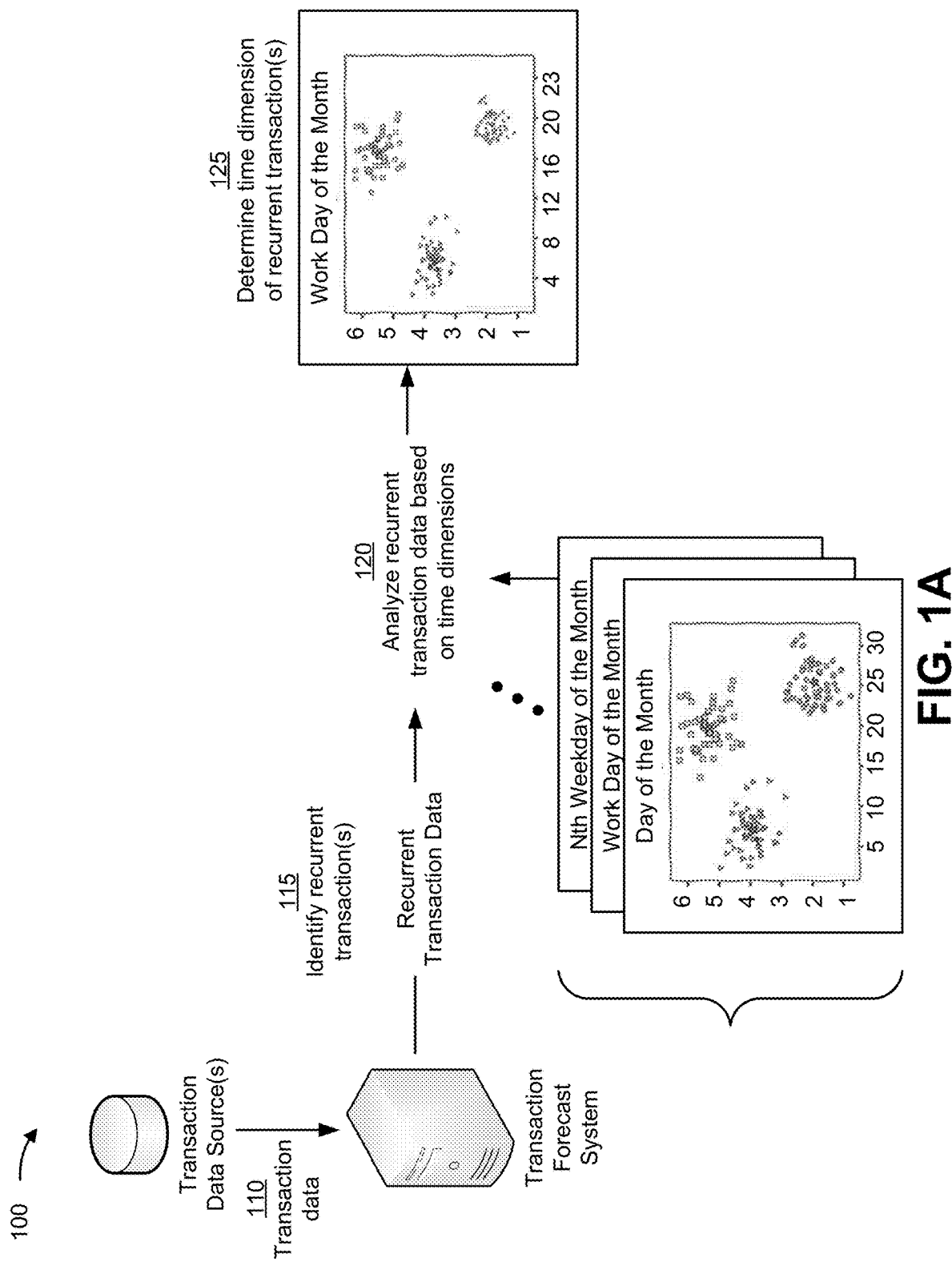
FIGS. 1A-1B are diagrams of one or more example implementations described herein.

The following detailed description of example implementations refers to the accompanying drawings. The same reference numbers in different drawings may identify the same or similar elements.

Sometimes, an entity may want to make a prediction concerning one or more financial transactions. For example, a financial manager of the entity may want to estimate future payments to be made by the entity, future payments to be made to the entity, and/or the like. In some cases, the financial manager may use a device that utilizes a machine learning model to generate a forecast concerning the one or more financial transactions.

However, current forecast methodologies utilized by a machine learning model may have difficulties dealing with prolonged sequences of inactivity followed by a spike of activity. As such, in many cases, the forecast generated by the machine learning model may not be accurate. This may cause the financial manager to use computing resources (e.g., processing resources, memory resources, power resources, communication resources, and/or the like) of one or more devices, such as a user device, a server device, a networking device, and/or the like to manage transaction accounts of the entity and/or resources associated with the transaction accounts in an ineffective and/or inefficient manner.

Some implementations described herein provide a transaction forecast system that may process historical data to train one or more machine learning models and may generate, utilizing the one or more machine learning models, a transaction forecast based on one or more time dimensions. For example, the transaction forecast system may receive transaction information associated with generating a transaction forecast. The transaction forecast system may utilize a machine learning model to generate a plurality of clusters associated with a set of previous transactions based on one or more time dimensions. The transaction forecast system may determine similarity or evaluation scores for the plurality of clusters that correspond to individual probabilities that the set of previous transactions occurred according to the plurality of time dimensions. The transaction forecast system may select a time dimension based on the similarity or evaluation scores. The transaction forecast system may generate a transaction forecast based on the time dimension.

In this way, the forecast analysis platform may optimize generation of a transaction forecast concerning recurrent financial transactions associated with periods of inactivity followed by spikes of activity, which may provide a more accurate transaction forecast than would otherwise be generated. This may reduce a demand for computing resources (e.g., processing resources, memory resources, power resources, communication resources, and/or the like) that would otherwise be used by one or more devices to manage less accurate financial transaction. For example, the transaction forecast system may generate a transaction forecast that is more accurate than generated previously, which decreases a likelihood that budgets, reports, and/or the like based on future financial transaction would need to be modified.

Moreover, the transaction forecast system may perform an action, such as automatically allocating computing resources for processing the financial transactions, which may reduce a need for a manager to manually allocate the resources using the one or more devices. As an example, the transaction forecast system may determine that a large quantity of financial transactions are forecast to occur on a particular day based on the transaction forecast. The transaction forecast system may determine computing resources required to process the financial transactions and may allocate the required resources for processing the financial transactions on the particular day. As another example, the transaction forecast system may determine that a small quantity of financial transactions are forecast to occur on another day based on the transaction forecast. The transaction forecast system may enable computing resources normally utilized to process financial transactions to be utilized to perform one or more other processes on the other day based on determining that the small quantity of financial transactions are forecast to occur on the other day.

Figure 1B:
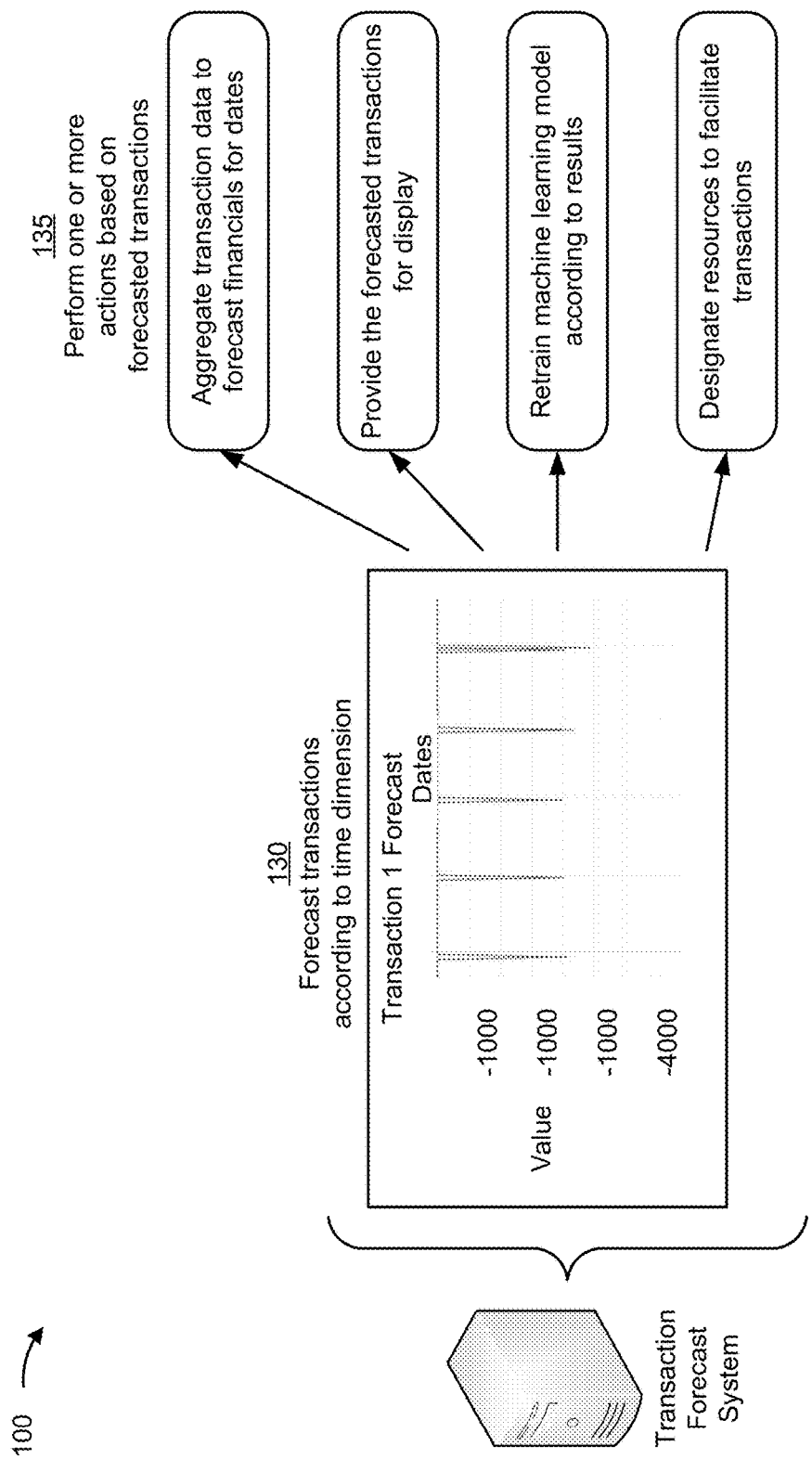

FIGS. 1A-1B are diagrams of one or more example implementations 100 described herein. As shown in FIGS. 1A-1B, the one or more example implementations 100 include a transaction forecast system and one or more data sources. In some implementations, the transaction forecast system and the one or more data sources may be connected via a network, such as a wired network (e.g., the Internet and/or another data network), a wireless network (e.g., a wireless local area network, a wireless wide area network, a cellular network, etc.), and/or the like. Some example implementations described herein concern a single transaction forecast system and/or a single data source, but implementations can include a plurality of transaction forecast systems and/or a plurality of data sources.

The transaction forecast system may include one or more devices configured to analyze historical transaction data and to generate a transaction forecast based on the analysis. The transaction forecast may include information indicating a timing (e.g., a date, a day of a week, a day of a month, and/or the like) that a transaction is forecast to occur, a value (e.g., a monetary amount) of the transaction, and/or the like.

In some implementations, the transaction forecast system generates the transaction forecast based on a user input. A user may determine to generate a transaction forecast associated with a future period of time (e.g., the next day, the next week, the next month, the next year, and/or the like). The user may provide forecast information to the transaction forecast system via a user interface associated with the transaction forecast system.

The forecast information may include information indicating that the transaction forecast system is to generate a transaction forecast, information identifying the future period of time, information identifying a forecast parameter, and/or the like. The forecast parameter may include information indicating a scope of the transaction forecast. For example, the forecast parameter may indicate that the transaction forecast is to be generated for all financial transactions, receiveable financial transactions, payable financial transactions, and/or the like.

In some implementations, the transaction forecast system obtains transaction data based on receiving the forecast information. As shown by reference number 110, the transaction forecast system obtains transaction data from one or more transaction data sources. In some implementations, the transaction forecast system periodically obtains the transaction data. For example, the transaction forecast system may obtain the transaction data every day, every week, every month, and/or the like.

The transaction data may include historical transaction data associated with a plurality of financial transactions occurring during a previous period of time (e.g., the past day, the past week, the past month, the past year, and/or the like). In some implementations, the transaction forecast system determines the previous period of time based on the forecast information. The transaction forecast system may determine a length of the future period of time (e.g., a number of days, a number of weeks, a number of months, and/or the like) and may determine the previous period of time based on the length of the future period of time. For example, the transaction forecast system may determine the previous period of time to have an ending date occurring one day prior to a current date. The transaction forecast system may determine a beginning date for the period of time to cause a length of the previous period of time to be equal to a length of the future period of time, twice the length of the future period of time, and/or the like.

In some implementations, the transaction forecast system obtains the transaction information based on the forecast parameter. The transaction forecast system may determine the scope of the transaction forecast based on the forecast parameter and may obtain transaction data associated with the scope of the transaction forecast. As an example, the forecast parameter may indicate that the transaction forecast system is to generate the transaction forecast for receivable financial transactions. The transaction forecast system may obtain transaction data associated with receivable financial transactions from the one or more data sources based on the transaction forecast being generated for receivable financial transactions.

The historical transaction data may include information identifying a payor associated with a financial transaction, information identifying a payee associated with the financial transaction, information identifying a date of the financial transaction, information identifying an amount of the financial transaction, and/or the like.

In some implementations, the transaction data includes transaction information associated with one or more financial transactions of the plurality of financial transactions. The transaction information may include information indicating a financial obligation. For example, the transaction information may include an invoice identifying a payment to be made on or before a particular date, a sales contract indicating a schedule of payments, and/or the like.

In some implementations, the transaction data includes external financial data. The external financial data may include market data, information associated with regulations related to the financial transaction (e.g., governmental regulations, internal regulations associated with the entity, and/or the like), information identifying a factor that may influence a timing of a financial transaction (e.g., an economic factor (e.g., an increase in a demand for a particular product, a surge in the stock market, and/or the like), an occurrence of a weather condition (e.g., a hurricane, a blizzard, and/or the like), and/or the like), and/or the like.

In some implementations, the transaction forecast system may modify a format of the transaction data. The transaction forecast system may receive the transaction data from a plurality of data sources. Each data source may provide the transaction data in a different format. The transaction forecast system may modify the format of one or more portions of the transaction data to cause the transaction data to have a common format.

The transaction forecast system may process the transaction data using a data feature extraction engine. For example, the transaction forecast system may process transaction data using a data feature extraction engine after normalizing the transaction data.

In some implementations, when processing the data using the data feature extraction engine, the transaction forecast system may tokenize the transaction data using a tokenization technique. For example, the transaction forecast system may generate various sequences of characters from transaction data identified in an invoice. Continuing with the previous example, the transaction forecast system may generate a set of multiple terms from a multi-term phrase, may contract a phrase to an acronym (or may expand an acronym), may classify data as a particular type of data and may remove a symbol from the data that indicates the classification of the data (e.g., may classify "$1.00" as a dollar amount and may tokenize "$1.00" to "1"), may remove particular terms and/or phrases from the data (e.g., may remove ", Inc." or "Company" from data that includes an organization's name), and/or the like. This reduces a size of the data, thereby conserving memory resources of the procurement analysis platform when storing the data, thereby conserving processing resources when processing the data, and/or the like.

In some implementations, when processing the data using the data feature extraction engine, the transaction forecast system may normalize the transaction data using a normalization technique. For example, the transaction forecast system may process the transaction data to reduce or eliminate inconsistencies among the transaction data (e.g., inconsistencies across data sets from different data sources or inconsistencies with respect to a reference set of data). Continuing with the previous example, the transaction forecast system may convert plural terms to singular terms (or vice versa), may add to and/or remove letters, punctuation, and/or the like with respect to the transaction data (e.g., may convert "USA." to "USA"), may correct misspellings in the transaction data, may convert a variation of a term to a common term (e.g., may convert "Comp. A" and "Company A" to "A"), and/or the like. This reduces or eliminates inconsistencies in the transaction data, which places the transaction data in a form that is easier for the transaction forecast system to process during other operations of the transaction forecast system and thereby conserves processing resources of the transaction forecast system.

As shown by reference number 115, the transaction forecast system identifies one or more recurrent transactions. A recurrent transaction may be a financial transaction that occurs periodically (e.g., daily, weekly, monthly, quarterly, yearly, and/or the like). In some implementations, the transaction forecast system identifies the one or more recurrent transactions based on the transaction data. The transaction forecast system may analyze the transaction data to determine a group of financial transactions having one or more common characteristics (e.g., a same payor, a same payee, a same amount, a same account number, and/or the like). The transaction forecast system may identify the group of financial transactions as a recurrent transaction based on the group of financial transactions having the one or more common characteristics.

As shown by reference number 120, the transaction forecast system analyzes recurrent transaction data associated with a recurrent transaction (e.g., a portion of the transaction data associated with the recurrent transaction) based on a plurality of time dimensions. The recurrent transaction data may include information identifying a transaction type associated with a financial transaction (e.g., a payroll transaction, a tax payment transaction, a monthly payable, a monthly receivable, and/or the like) associated with the recurrent transaction, a location associated with the financial transaction (e.g., a city, a state, a country, and/or the like), an entity associated with the financial transaction (e.g., a payor, a payee, a business, a business unit, and/or the like), a date of the financial transaction, a monetary amount associated with the financial transaction, and/or the like.

The transaction forecast system may determine a date on which a financial transaction, of the group of financial transactions associated with the recurrent transaction, occurred based on the recurrent transaction data. The transaction forecast system may map the date to the plurality of time dimensions.

In some implementations, the plurality of time dimensions includes a day of month time dimension based on the date on which the financial transaction occurred. The transaction forecast system may determine a month that the financial transaction occurred based on the date. The transaction forecast system may associate each day of the month with a value (e.g., the first day of the month may be associated with a value of 1, the second day of the month may be associated with a value of 2, and/or the like). The transaction forecast system may map the financial transaction to the day of month time dimension by determining the value associated with the day of the month on which the transaction occurred. The transaction forecast system may map each financial transaction, of the group of financial transactions, to the day of month time dimension in a manner similar to that described above.

In some implementations, the plurality of time dimensions includes an end of month time dimension. The transaction forecast system may associate each day of the month that the financial transaction occurred with a value indicating a quantity of days prior to the end of the month that the day occurs. As an example, the financial transaction may have occurred in March. The transaction forecast system may associate March 31$^{st}$ with a value of 0 based on March 31$^{st}$ being the end of the month, the transaction forecast system may associate March 30$^{th}$ with a value of 1 based on March 30$^{th}$ occurring one day prior to the end of the month, and/or the like. The transaction forecast system may map the financial transaction to the end of month time dimension by determining the value associated with the day of the month on which the transaction occurred. The transaction forecast system may map each financial transaction, of the group of financial transactions, to the end of month time dimension in a manner similar to that described above.

In some implementations, the plurality of time dimensions includes a working day time dimension. The transaction forecast system may determine a quantity of working days included in the month in which the financial transaction occurred. In some implementations, the transaction forecast system determines the quantity of working days based on a location associated with the financial transaction. The transaction forecast system may determine a location associated with the financial transaction (e.g., a location at which the financial transaction occurred, a location of the payor, a location of the payee, and/or the like) based on the recurrent transaction data.

The transaction forecast system may identify working days and/or non-working days (e.g., holidays, weekends, and/or the like) associated with the location for the month in which the financial transaction occurred. The transaction forecast system may associate each working day with a value (e.g., the first working day of the month may be associated with a value of 1, the second working day of the month may be associated with the value of 2, and/or the like). The transaction forecast system may map the financial transaction to the working day time dimension by determining the value associated with the day of the month on which the transaction occurred. The transaction forecast system may map each financial transaction, of the group of financial transactions, to the working day time dimension in a manner similar to that described above.

In some implementations, the plurality of time dimensions includes a working days until end of month time dimension. The transaction forecast system may determine a month in which the financial transaction occurred based on the recurrent transaction data. The transaction forecast system may determine a total quantity of working days included in the month in a manner similar to that described above. The transaction forecast system may associate each working day of the month that the financial transaction occurred with a value indicating a quantity of working days prior to the end of the month that the working day occurs. As an example, the financial transaction may have occurred in March. The transaction forecast system may determine that March 31$^{st}$ is the last working day of the month for the year in which the financial transaction occurred. The transaction forecast system may associate March 31$^{th}$ with a value of 0 based on March 31$^{th}$ being the last working day of the month. The transaction forecast system may associate March 30$^{th}$ with a value of 1 based on determining that March 30$^{th}$ is a working day occurring one day prior to the last working day of the month, and/or the like. The transaction forecast system may map the financial transaction to the working days until the end of month time dimension by determining the value associated with the day of the month on which the transaction occurred. The transaction forecast system may map each financial transaction, of the group of financial transactions, to the working days until the end of month time dimension in a manner similar to that described above.

The transaction forecast system may generate a group of one or more clusters based on mapping the financial transactions to a first time dimension (e.g., the day of month time dimension). In some implementations, the transaction forecast system generates the group of one or more clusters based on plotting the financial transactions on a graph. A horizontal axis of the graph may correspond to the values determined for each day of the month for mapping the financial transaction to the first time dimension. A vertical axis of the graph may correspond to a characteristic associated with the financial transactions (e.g., a value associated with the financial transactions, a location associated with the financial locations, and/or the like). The transaction forecast system may generate the group of one or more clusters by plotting the financial transactions on the graph based on the respective values associated with the dates of the financial transactions and the respective characteristics associated with the financial transactions.

The transaction forecast system may generate a group of one or more clusters for each time dimension, of the plurality of time dimensions, in a manner similar to that described above. In some implementations, the transaction forecast system may predict an expected quantity of transactions occurring during a time period. The transaction forecast system may determine a respective quantity of clusters included in the group of one or more clusters for each time dimension based on the expected quantity of transactions occurring during the time period. The transaction forecast system may determine a best fit time dimension for each cluster, as described below.

In some implementations, the transaction forecast system utilizes a model to analyze the recurrent transaction data based on the time dimensions. For example, the transaction forecast system may utilize a machine learning model to analyze the recurrent transaction data based on the time dimensions, as described below with respect to FIG. 3. The transaction forecast system may provide the recurrent transaction data to the machine learning model as an input. The machine learning model may utilize one or more algorithms to map financial transactions associated with the recurrent transaction to the plurality of time dimensions. The machine learning model may generate groups of clusters based on mapping the financial transactions to the plurality of time dimensions.

In some implementations, the transaction forecast system may select the model, from a plurality of models (e.g., a machine learning model, a time series model, and/or another type of model), based on a parameter associated with the recurrent transaction such as a transaction type (e.g., payable transactions, receivable transactions, and/or the like), a location associated with recurrent transaction, and/or the like. In some implementations, the transaction forecast system determines the parameter based on information input by a user. For example, a user may utilize the user interface associated with the transaction forecast system to input information indicating that the transaction forecast system is to generate a transaction forecast associated with a particular type of transaction, transactions associated with a particular location, transactions associated with a particular entity, and/or the like. The transaction forecast system may select the model, from the plurality of models, based on the parameter.

In some implementations, the models are associated with respective accuracy scores related to generating transaction forecasts associated with the parameter. The accuracy scores may be determined for the models based on performing a batch processing process, as described below with respect to FIG. 2. The transaction forecast system may select the model based on the accuracy score associated with the model being a higher accuracy score relative to accuracy scores associated with other models, based on the accuracy score satisfying a threshold accuracy score, based on the accuracy score indicating a best daily forecast accuracy, based on the accuracy score indicating a best total cashflow accuracy over the full forecasted time horizon, and/or the like. Alternatively, and/or additionally, the transaction forecast system may select the model based on the model having an accuracy score with the least amount of variance over multiple iterations relative to other models.

In some implementations, the transaction forecast system selects the model based on user input. For example, the transaction forecast system may provide the accuracy scores for display to a user via a user interface associated with the transaction forecast system. The user may analyze the accuracy scores and may select a model, from the plurality of models based on the analysis.

As shown by reference number 125, the transaction forecast system determines a time dimension of the recurrent transaction. In some implementations, the transaction forecast system determines the time dimension of the recurrent transaction based on the group of one or more clusters generated for the plurality of time dimensions.

The transaction forecast system may determine a centroid for a cluster of the group of one or more clusters. The centroid may be a center or average value associated with the cluster. The transaction forecast system may determine a distance (e.g., an Euclidean distance) that each financial transaction included in the cluster is from the centroid. The transaction forecast system may determine an average distance based on the distance that each financial transaction is from the centroid.

The transaction forecast system may determine the time dimension for the recurrent transaction based on the average distance determined for the cluster. The transaction forecast system may identify a cluster for which the shortest average distance was determined relative to the average distances determined for the other clusters. The transaction forecast system may determine a time dimension associated with the identified cluster. The transaction forecast system may determine that the time dimension is the time dimension for the recurrent transaction based on the time dimension being associated with the identified cluster.

As shown in FIG. 1B, and by reference number 130, the transaction forecast system forecasts transactions according to the time dimension. The transaction forecast system may determine a date and/or a monetary amount associated with the centroid of the cluster associated with the time dimension. The transaction forecast system may determine that the recurrent transaction, having a monetary value corresponding to the monetary amount associated with the centroid of the cluster, will occur on the date associated with the centroid of the cluster. The transaction forecast system may forecast a transaction in a similar manner for each cluster associated with the time dimension.

As shown by reference number 135, the transaction forecast system performs one or more actions based on the forecasted transactions. In some implementations, the one or more actions includes aggregating transaction data to forecast financials for dates. The transaction forecast system may identify a plurality of recurrent transactions based on the transaction data. The transaction forecast system may forecast transactions for each of the plurality of recurrent transactions in a manner similar to that described above. The transaction forecast system may identify a group of forecasted transactions associated with the same date. The transaction forecast system may aggregate the group of forecasted transactions (e.g., determine a net amount to be paid, determine a net amount to be received, and/or the like) based on the group of transactions being associated with the same date. By aggregating the group of transactions, the transaction forecast system may predict an amount of money an entity may need to have available on a particular date, an amount of money an entity may receive on a particular date, and/or the like. In this way, the transaction forecast system may enable an entity to make long term financial plans based on a forecasted flow of money. For instance, the transaction forecast system may determine, based on the transaction forecast, that an ending cash balance of a financial transaction account may be lower or higher than is desired on a particular date and may automatically schedule a transaction to transfer cash to or from the financial transaction account prior to the particular date. This may allow for automatic management of the financial transaction account, which may reduce a need to use resources (e.g., processing resources, memory resources, power resources, networking resources, and/or the like) of one or more devices that would otherwise be needed to monitor and manage the financial transaction account.

In some implementations, the one or more actions include matching an open invoice with a forecasted transaction. The transaction forecast system may identify an open invoice. The transaction forecast system may compare the open invoice with a forecasted transaction and may determine that the forecasted transaction corresponds to the open invoice based on the comparison. In some implementations, an amount associated with the forecasted transaction is different than an amount associated with the open invoice. The transaction forecast system may modify the amount associated with the forecasted transaction and/or the amount associated with a cluster that includes the forecasted transaction based on the amount associated with the invoice.

In some implementations, the one or more actions includes identifying a forecasted transaction that is not matched with an open invoice. The transaction forecast system may determine that an invoice for the forecasted transaction has not been issued based on the forecasted transaction not being matched with an open invoice. In some implementations, the transaction forecast system may provide a notification indicating that the invoice has not been issued, may automatically generate an invoice for the forecasted transaction, and/or may automatically issue the invoice for the forecasted transaction.

In some implementations, the one or more actions include providing the forecasted transaction (e.g., the transaction forecast) for display. The transaction forecast system may send the transaction forecast to a client device to enable the client device to display the transaction forecast to a user. In this way, the user may be able to visually analyze the transaction forecast.

In some implementations, the one or more actions include retraining the machine learning model according to the results. The transaction forecast system may process the transactional data and/or the transaction forecast to update and/or retrain the machine learning model, which may improve an accuracy of the machine learning model by providing additional data for training the machine learning model.

In some implementations, the one or more actions include designating resources to facilitate transactions. The transaction forecast system may determine a quantity of transactions occurring on a particular date based on the transaction forecast. The transaction forecast system may determine computing resources required to process the quantity of transactions. The transaction forecast system may cause the required computing resources to be allocated for processing the financial transactions on the particular date. In this way, the transaction forecast system may efficiently manage computing resources to ensure that sufficient resources are available for processing the quantity of financial transactions on the particular date, that excess resources previously allocated for processing financial transactions on the particular date are allocated for performing other processes, and/or the like.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
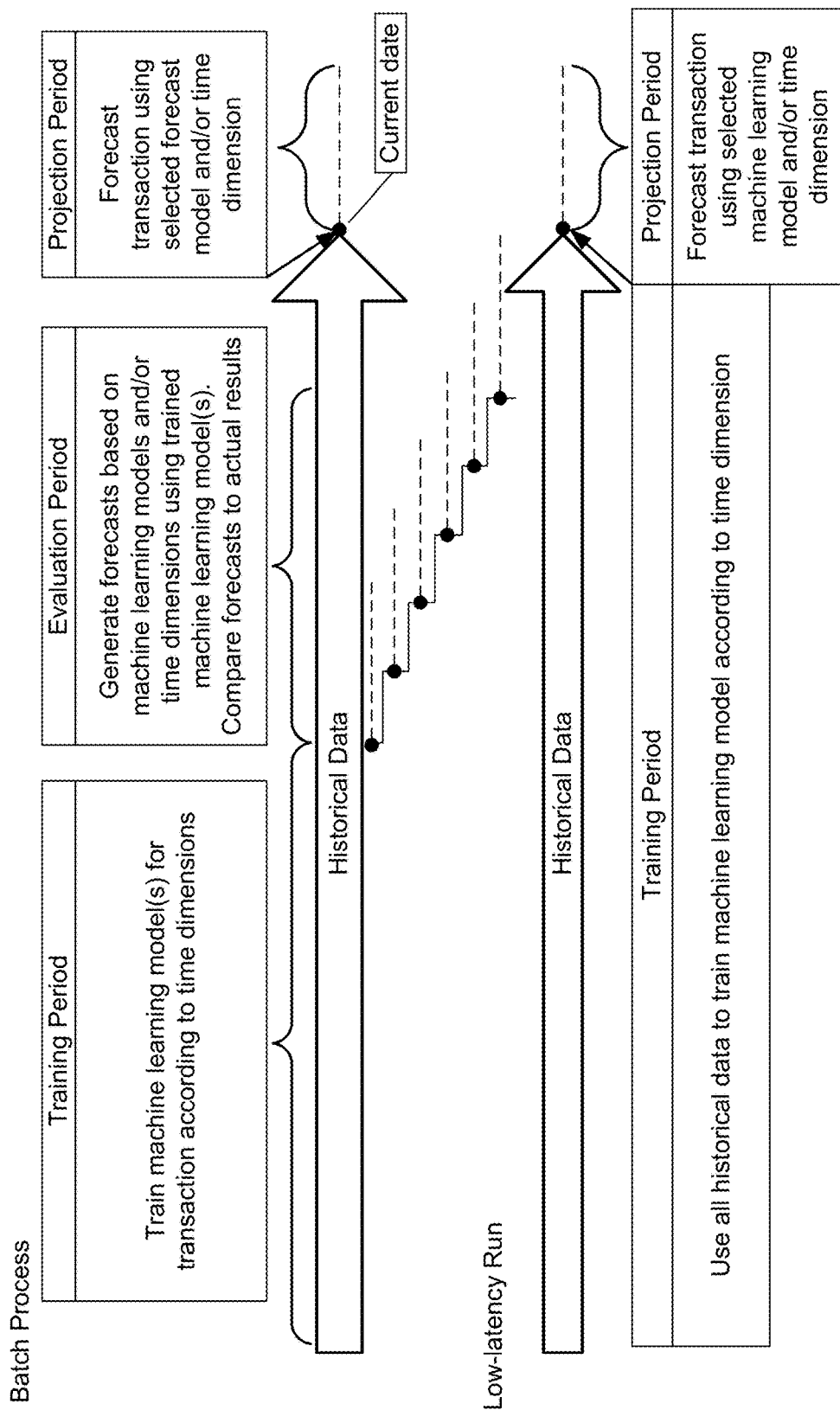
FIG. 2 is a diagram of an example implementation described herein.

FIG. 2 is a diagram of an example implementation 200 described herein. As shown in FIG. 2, the transaction forecast system utilizes a batch process and/or a low-latency run process to train one or more machine learning models and/or to generate a transaction forecast.

In some implementations, the transaction forecast system utilizes a batch process to train one or more machine learning models based on historical transaction data. In some implementations, the one or more machine learning models may include a modified k-means machine learning model. The modified k-means machine learning model may cluster financial transactions based on a time dimension, as described in greater detail below. Alternatively, and/or additionally, the one or more machine learning models may include a seasonal autoregressive integrated moving average (SARIMA) machine learning model; a seasonal autoregressive integrated moving average with exogenous variables (SARIMAX) machine learning model; a long short-term memory (LSTM) machine learning model; an exponential smoothing machine learning model; a business logic machine learning model; a naïve machine learning model; and/or the like.

In some implementations, the transaction forecast system generates and/or trains a first set of machine learning models, of the one or more machine learning models, to generate a first type of transaction forecast; a second set of machine learning models to generate a second type of transaction forecast; a third set of machine learning model to generate a third type of transaction forecast; and/or the like. For example, the transaction forecast system may generate and/or train each machine learning model, of the first set of machine learning models, to generate a transaction forecast concerning a first parameter associated with the historical transaction data (e.g., a transaction forecast associated with a particular type of financial transaction). As another example, the transaction forecast system may generate and/or train each machine learning model, of the second set of machine learning models, to generate a transaction forecast concerning a second parameter associated with the historical transaction data (e.g., a transaction forecast associated with financial transactions associated with a particular location). In another example, the forecast analysis platform may generate and/or train each machine learning model, of the third set of machine learning models, to generate a transaction forecast concerning a third parameter associated with the historical transaction data (e.g., a period of time (e.g., a week, a month, a year, and/or the like) associated with the transaction forecast).

In some implementations, rather than train separate models to generate different types of transaction forecasts, the transaction forecast system trains each machine learning model, of the one or more machine learning models, to generate the first type of transaction forecast, the second type of transaction forecast, the third type of transaction forecast, and/or the like.

In some implementations, the transaction forecast system trains a machine learning model, of the one or more machine learning models, using historical data (e.g., the historical transaction data and/or the historical data concerning the one or more parameters) obtained by the transaction forecast system from one or more data sources according to the time dimensions. For example, the transaction forecast system may divide the historical data into a first portion of historical data and a second portion of historical data. The first portion of historical data may be associated with a first period of time (e.g., a training period, as shown in FIG. 2) and the second portion of historical data may be associated with a second period of time (e.g., an evaluation period, as shown in FIG. 2) that occurs after the first period of time (e.g., the first period of time may be associated with a two year period of time and the second period of time may be associated with a one year period of time that occurs after the first period of time).

In some implementations, the second period of time is a period of time that is at least as long as a third period of time (e.g., projection period, as shown in FIG. 2) that occurs after the second period of time. The third period of time may correspond to a period of time for which financial transactions are to be forecast.

In some implementations, the first period of time, the second period of time, and/or the third period of time are determined based on user input. A user may input information identifying a start of the first period of time (e.g., information identifying a date) and/or information identifying a start of the second period of time. The transaction forecast system may determine an end of the first period of time corresponding to a day prior to the start of the second period of time. The transaction forecast system may determine an end of the second period of time to a period of time corresponding to a day before a current date (e.g., a date on which the transaction forecast is to be generated). The transaction forecast system may determine a start of the third period of time corresponding to the current date. The transaction forecast system may determine an end to the third period of time based on a length of the second period of time. The transaction forecast system may determine an end to the third period of time to cause a length of the third period of time to be equal to, or less than, the second period of time.

The transaction forecast system may process the first portion of historical data (also referred to herein as training data) to train one or more machine learning models. In some implementations, the transaction forecast system trains the one or more machine learning models in a manner similar to that described below with respect to FIG. 3.

The transaction forecast system may use the second portion of historical data to evaluate predictions generated by the machine learning model. The transaction forecast system may generate one or more initial transaction forecasts (e.g., using the one or more machine learning models) based on the time dimensions. The transaction forecast system may process the first portion of historical data, using at least one machine learning model of the one or more machine learning models, to generate an initial transaction forecast based on a time dimension. In some implementations, the initial transaction forecast may be associated with the second period of time (e.g., the period of time associated with the second portion of historical data).

In some implementations, the transaction forecast system generates one or more first initial transaction forecasts based a first time dimension; one or more second initial transaction forecasts based on a second time dimension; one or more third initial transaction forecasts based on a third time dimension; and/or the like. In this way, the transaction forecast system may generate at least one initial transaction forecast based on different time dimensions associated with the historical transaction data.

The transaction forecast system may evaluate the one or more initial transaction forecasts. The transaction forecast system may compare the one or more initial transaction forecasts and the second portion of historical data to evaluate the one or more initial transaction forecasts (e.g., because the one or more or more initial transaction forecasts predict some or all of the information that is included in the second portion of historical data).

In some implementations, to compare the one or more initial transaction forecasts and the second portion of historical data, the transaction forecast system uses a root mean square error processing technique; a mean square error processing technique; a weighted root mean square error technique; a percentage error technique; a mean absolute error technique; a mean percentage error technique; and/or the like. The transaction forecast system may generate one or more evaluation scores based on comparing the one or more initial transaction forecasts and the second portion of historical data. Each evaluation score may be respectively associated with an initial transaction forecast of the one or more initial transaction forecasts. An evaluation score may have a value that indicates a degree of fit of a respective initial transaction forecast to the second portion of historical data. For example, an evaluation score may have a value range from 0 to 1, where a low value (e.g., greater than or equal to 0 and less than 0.5) indicates a low degree of fit and a high value (e.g., greater than or equal to 0.5 and less than or equal to 1) indicates a high degree of fit.

The transaction forecast system may determine an initial transaction forecast having a highest evaluation score relative to other evaluation scores. The transaction forecast system may determine a time dimension and/or a machine learning model associated with the initial transaction forecast. The transaction forecast system may utilize the time dimension and/or the machine learning model to generate the transaction forecast based on the time dimension and/or the machine learning model being associated with the initial transaction forecast having the highest evaluation score.

In some implementations, the transaction forecast system performs a low-latency run process to generate the transaction forecast based on the time dimension and/or the machine learning model associated with the initial transaction forecast having the highest evaluation score. The low-latency run process may include a training period and a projection period. During the training period, the transaction forecast system may utilize all of the historical data (e.g., the first portion of the historical data and the second portion of the historical data) to train the machine learning model to generate a transaction forecast based on the time dimension. The transaction forecast system may train the machine learning model in a manner similar to that described below with respect to FIG. 3. The transaction forecast system may utilize the trained machine learning model to generate a transaction forecast for the projection period based on the time dimension. The transaction forecast system may utilize the machine learning model to generate the transaction forecast in a manner similar to that described herein.

As indicated above, FIG. 2 is provided as an example. Other examples may differ from what is described with regard to FIG. 2.

Figure 3:
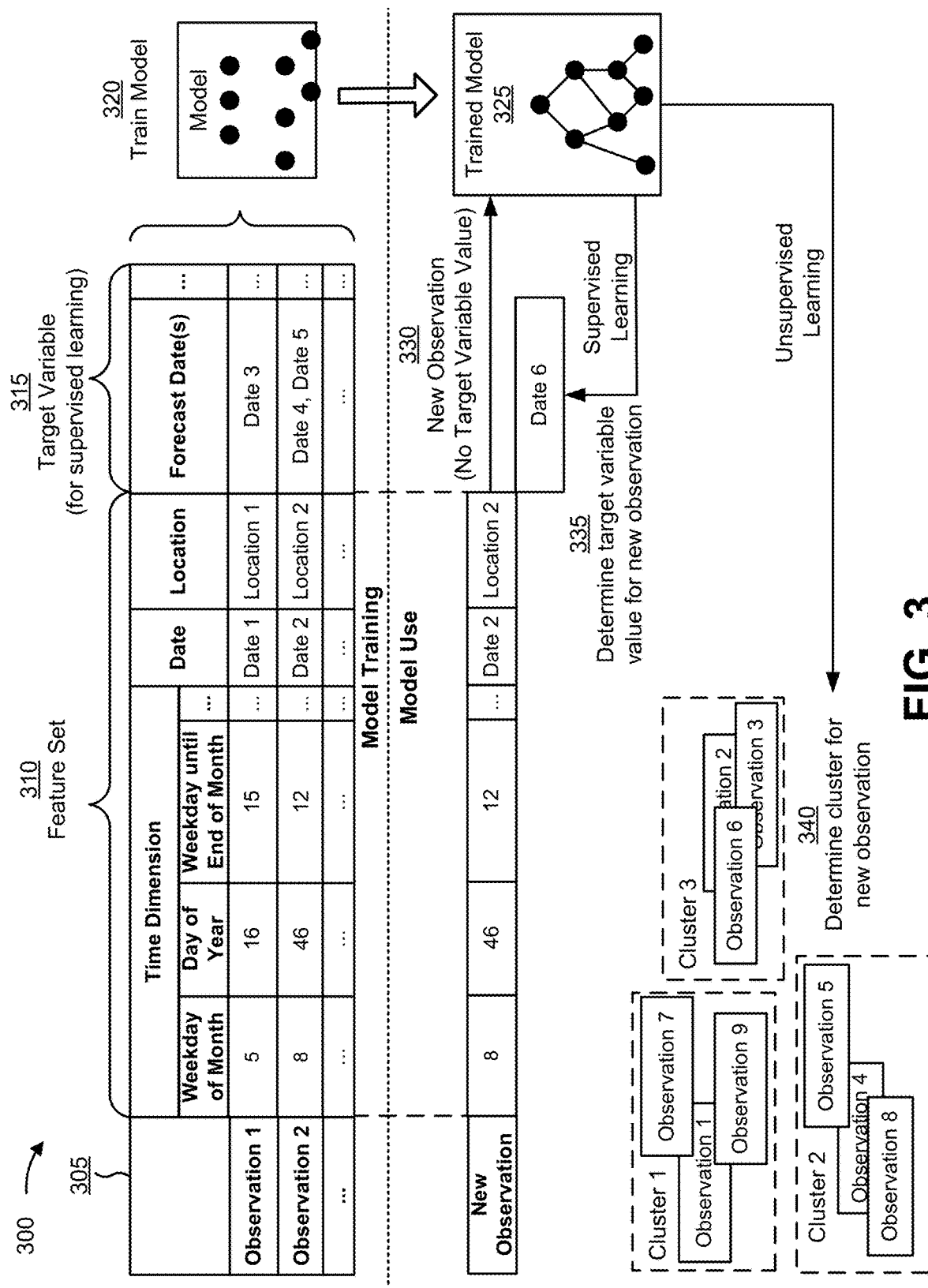
FIG. 3 is a diagram illustrating an example of training and using a machine learning model in connection with generating a forecast based on multiple time dimensions.

FIG. 3 is a diagram illustrating an example 300 of training and using a machine learning model in connection with generating a forecast based on multiple time dimensions. The machine learning model training and usage described herein may be performed using a machine learning system. The machine learning system may include or may be included in a computing device, a server, a cloud computing environment, and/or the like, such as the transaction forecast system described in more detail elsewhere herein.

As shown by reference number 305, a machine learning model may be trained using a set of observations. The set of observations may be obtained from historical data, such as data gathered during one or more processes described herein. In some implementations, the machine learning system may receive the set of observations (e.g., as input) from the transaction forecast system, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the transaction forecast system. For example, the machine learning system may identify a feature set (e.g., one or more features and/or feature values) by extracting the feature set from structured data, by performing natural language processing to extract the feature set from unstructured data, by receiving input from an operator, and/or the like.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 325 may predict a value for the target variable for the new observation, as shown by reference number 335. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 325 may utilize a modified k-means algorithm to classify (e.g., cluster) the new observation in a cluster (e.g., based on a date of a financial transaction), as shown by reference number 340. The observations within a cluster may have a threshold degree of similarity.

In this way, the machine learning system may apply a rigorous and automated process to generating transaction forecasts. The machine learning system enables recognition and/or identification of tens, hundreds, thousands, or millions of features and/or feature values for tens, hundreds, thousands, or millions of observations, thereby increasing accuracy and consistency and reducing delay associated with generating transaction forecasts relative to requiring computing resources to be allocated for tens, hundreds, or thousands of operators to manually generate transaction forecasts using the features or feature values.

As indicated above, FIG. 3 is provided as an example. Other examples may differ from what is described in connection with FIG. 3.

Figure 4:
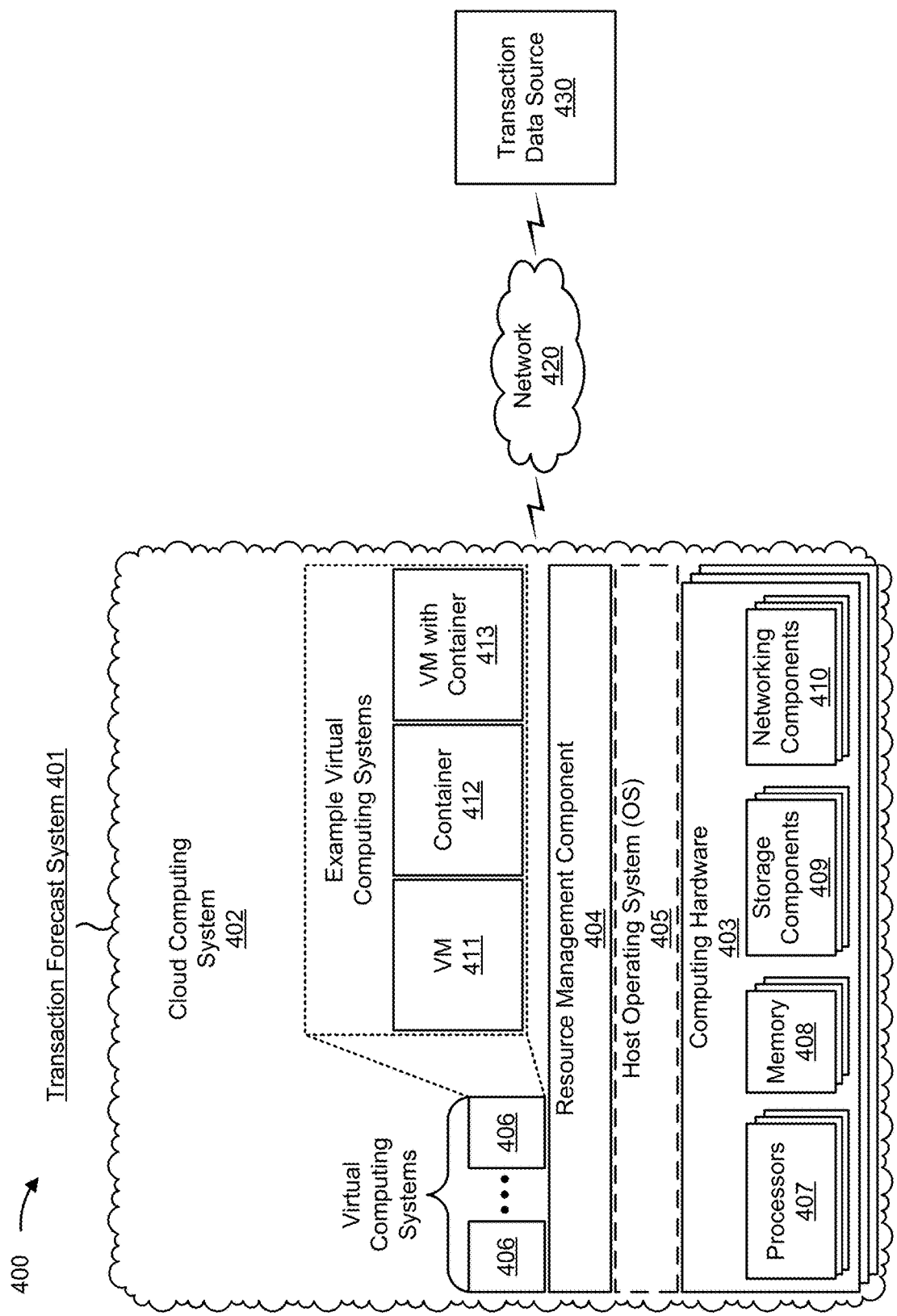
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a transaction forecast system 401, which may include one or more elements of and/or may execute within a cloud computing system 402. The cloud computing system 402 may include one or more elements 403-413, as described in more detail below. As further shown in FIG. 4, environment 400 may include a network 420, and/or a transaction data source 430. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, one or more storage components 409, and/or one or more networking components 410. Examples of a processor, a memory, a storage component, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines 411. Additionally, or alternatively, the resource management component 404 may include a container manager, such as when the virtual computing systems 406 are containers 412. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications using a file system that includes binary files, software libraries, and/or other resources required to execute applications on a guest operating system (e.g., within the virtual computing system 406) or the host operating system 405.

Although the transaction forecast system 401 may include one or more elements 403-413 of the cloud computing system 402, may execute within the cloud computing system 402, and/or may be hosted within the cloud computing system 402, in some implementations, the transaction forecast system 401 may not be cloud-based (e.g., may be implemented outside of a cloud computing system) or may be partially cloud-based. For example, the transaction forecast system 401 may include one or more devices that are not part of the cloud computing system 402, such as device 500 of FIG. 5, which may include a standalone server or another type of computing device. The transaction forecast system 401 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

Transaction data source 430 includes one or more devices capable of receiving, generating, storing, processing, and/or providing information associated with forecasting a transaction, as described elsewhere herein. Transaction data source 430 may include a communication device and/or a computing device. For example, transaction data source 430 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. Transaction data source 430 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
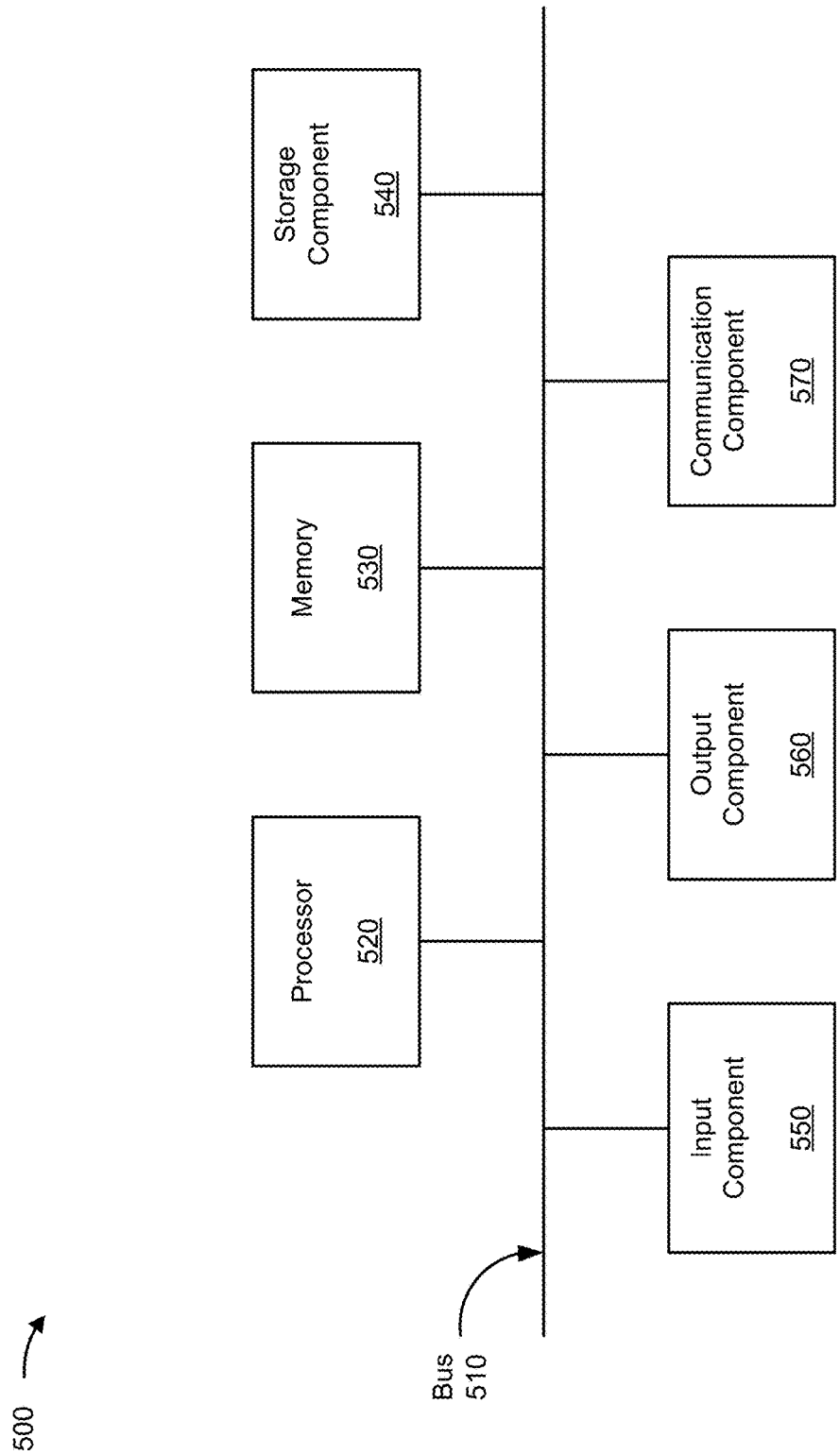
FIG. 5 is a diagram of example components of one or more devices of FIG. 4.

FIG. 5 is a diagram of example components of a device 500, which may correspond to transaction forecast system 401 and/or transaction data source 430. In some implementations, transaction forecast system 401 and/or transaction data source 430 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory), a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, an actuator, and/or the like. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, an antenna, and/or the like.

Device 500 may perform one or more processes described herein. For example, a non-transitory computer-readable medium (e.g., memory 530 and/or storage component 540) may store a set of instructions (e.g., one or more instructions, code, software code, program code, and/or the like) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
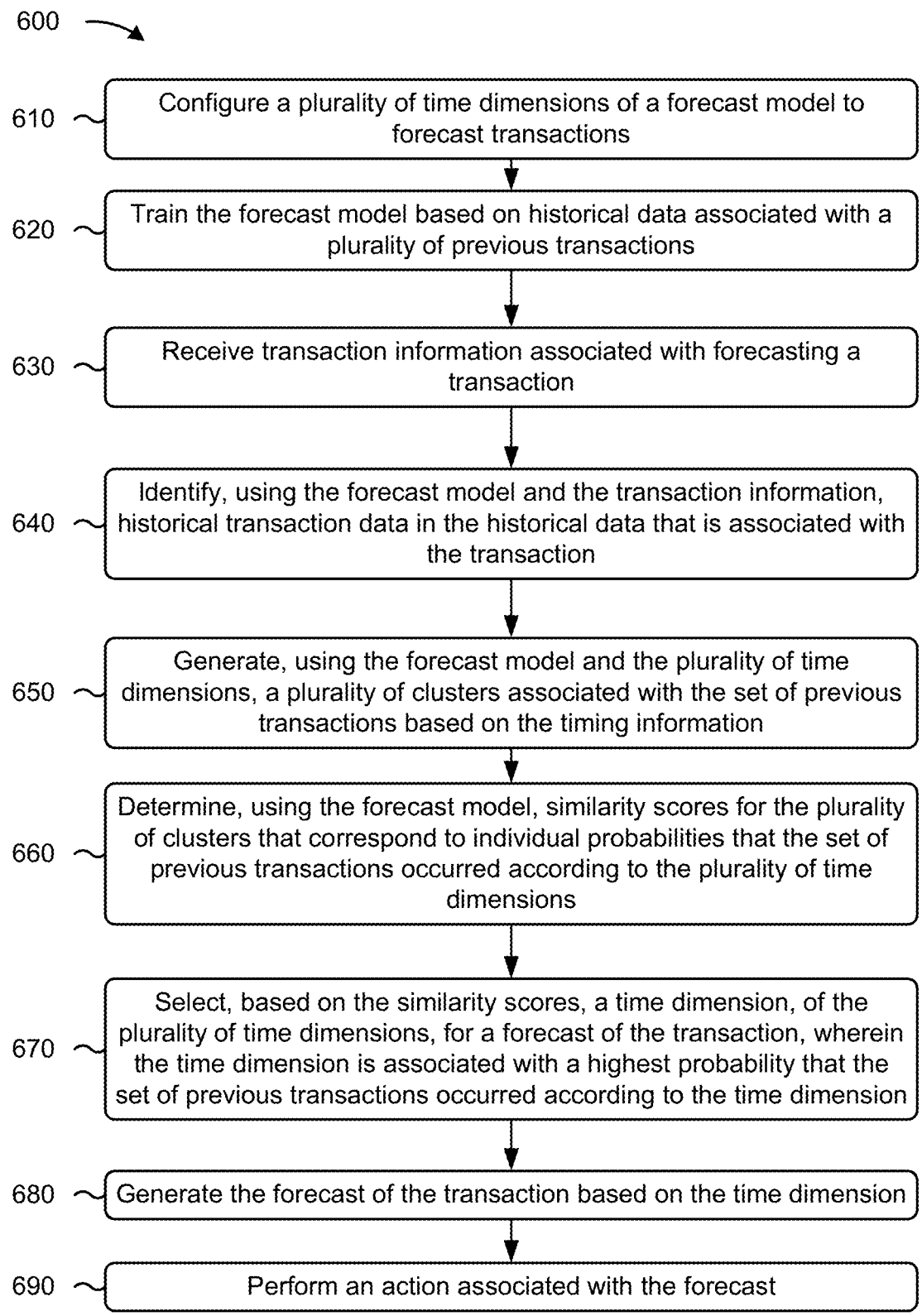
FIGS. 6 and 7 are flow charts of example processes relating to generating a forecast based on multiple time dimensions and machine learning techniques.

FIG. 6 is a flow chart of an example process 600 associated with generating a forecast based on multiple time dimensions and machine learning techniques. In some implementations, one or more process blocks of FIG. 6 may be performed by a device (e.g., transaction forecast system 401). In some implementations, one or more process blocks of FIG. 6 may be performed by another device or a group of devices separate from or including the device, such as a transaction data source (e.g., transaction data source 430) and/or the like. Additionally, or alternatively, one or more process blocks of FIG. 6 may be performed by one or more components of a device 500, such as processor 520, memory 530, storage component 540, input component 550, output component 560, communication component 570, and/or the like.

As shown in FIG. 6, process 600 may include configuring a plurality of time dimensions of a forecast model to forecast transactions (block 610). For example, the device may configure a plurality of time dimensions of a forecast model to forecast transactions, as described above. The plurality of time dimensions may comprise time periods associated with potential recurrences of a transaction. In some implementations, the forecast model may be configured to utilize an optimum time dimension to forecast the time of a transaction when a request to forecast the timing of the transaction is received.

In some implementations, process 600 may include receiving transaction information associated with forecasting a transaction; determining, based on the transaction information, a forecast period associated with the transaction; and selecting, based on the forecast period and from a plurality of time dimensions, a set of time dimensions for forecasting timing of the transaction.

As further shown in FIG. 6, process 600 may include training the forecast model based on historical data associated with a plurality of previous transactions (block 620). For example, the device may train the forecast model based on historical data associated with a plurality of previous transactions, as described above.

In some implementations, the forecast model may be trained based on timing information associated with executions of the plurality of previous transactions, time parameters of the plurality of time dimensions, and transaction information associated with the plurality of previous transactions.

In some implementations, the transaction information indicates that the transaction is a recurrent transaction and the historical transaction data is obtained based on the transaction being a recurrent transaction.

In some implementations, process 600 includes identifying, based on the transaction information, a characteristic of the transaction; analyzing historical data that includes the historical transaction data to identify the set of previous transactions based on the characteristic; and extracting the historic transaction data based on the set of previous transactions being associated with the characteristic.

As further shown in FIG. 6, process 600 may include receiving transaction information associated with forecasting a transaction (block 630). For example, the device may receive transaction information associated with forecasting a transaction, as described above.

As further shown in FIG. 6, process 600 may include identifying, using the forecast model and the transaction information, historical transaction data in the historical data that is associated with the transaction, wherein the historical transaction data includes timing information associated with executions of a set of previous transactions, of the plurality of previous transactions, that are associated with the transaction (block 640). For example, the device may identify, using the forecast model and the transaction information, historical transaction data in the historical data that is associated with the transaction, as described above. In some implementations, the historical transaction data includes timing information associated with executions of a set of previous transactions, of the plurality of previous transactions, that are associated with the transaction. In some implementations, the transaction information indicates that the transaction is a recurrent transaction. The historical transaction data may be identified based on analyzing the historical data to identify the set of previous transactions based on the transaction being a recurrent transaction.

As further shown in FIG. 6, process 600 may include generating, using the forecast model and the plurality of time dimensions, a plurality of clusters associated with the set of previous transactions based on the timing information (block 650). For example, the device may generate, using the forecast model and the plurality of time dimensions, a plurality of clusters associated with the set of previous transactions based on the timing information, as described above. In some implementations, the transaction information may be received in association with a user input. The user input may identify a forecast period associated with the transaction. The time dimension may be selected based on the forecast period.

In some implementations, generating the plurality of clusters comprises identifying, from the timing information, execution dates of the executions of the set of previous transactions; determining, according to a calendar system, date characteristics of the executions dates, and mapping, based on the date characteristics, the executions of the set of previous transactions to the date characteristics and corresponding time parameters of the plurality of time dimensions, the plurality of clusters are associated with quantities of the set of previous transactions occurring according to the corresponding time parameters.

In some implementations, process 600 includes identifying, from the historical transaction data, execution dates of the executions of the set of previous transactions; determining, according to a calendar system, date characteristics of the executions dates; and mapping, based on the date characteristics, the executions of the set of previous transactions to the date characteristics and corresponding time parameters of the set of time dimensions, wherein the plurality of clusters is associated with quantities of the set of previous transactions occurring according to the corresponding time parameters.

As further shown in FIG. 6, process 600 may include determining, using the forecast model, similarity scores for the plurality of clusters that correspond to individual probabilities that the set of previous transactions occurred according to the plurality of time dimensions (block 660). For example, the device may determine, using the forecast model, similarity scores for the plurality of clusters that correspond to individual probabilities that the set of previous transactions occurred according to the plurality of time dimensions, as described above.

In some implementations, the device may evaluate a plurality of clusters associated with the forecast model forecasting a particular transaction according to the plurality of time dimensions, wherein the transaction is associated with a particular characteristic and wherein the transaction is associated with a set of previous transactions of the plurality of previous transactions that are associated with the characteristic. For example, the device may evaluate a plurality of clusters associated with the forecast model forecasting a particular transaction according to the plurality of time dimensions, as described above. The plurality of characteristics may include at least one of a type of the transaction, a value of the transaction, a party of the transaction, or a recurrence characteristic of the transaction.

In some implementations, the transaction is associated with a particular characteristic. In some implementations, the transaction is associated with a set of previous transactions of the plurality of previous transactions that are associated with the characteristic. In some implementations, process 600 includes determining the respective cluster scores for the plurality of time dimensions based on a similarity of respective cluster data of the plurality of clusters.

In some implementations, process 600 includes receiving a forecast request associated with the transaction, wherein the forecast is requesting identifies the transaction by identifying the characteristic; selecting, based on the request identifying the characteristic, the forecast model from a plurality of forecast models; and causing the forecast model to forecast the timing of the transaction based on the time dimension.

As further shown in FIG. 6, process 600 may include selecting, based on the similarity scores, a time dimension, of the plurality of time dimensions, for a forecast of the transaction, wherein the time dimension is associated with a highest probability that the set of previous transactions occurred according to the time dimension (block 670). For example, the device may select, based on the similarity scores, a time dimension, of the plurality of time dimensions, for a forecast of the transaction, as described above. In some implementations, the time dimension is associated with a highest probability that the set of previous transactions occurred according to the time dimension.

As further shown in FIG. 6, process 600 may include generating the forecast of the transaction based on the time dimension (block 680). For example, the device may generate the forecast of the transaction based on the time dimension, as described above. In some implementations, generating the forecast comprises determining timing of the forecast based on the time dimension; determining a value of the transaction based on at least one of: previous transaction values of the set of previous transactions, or a pending transaction value associated with a pending transaction, and generating the forecast to include the timing and the value.

As further shown in FIG. 6, process 600 may include performing an action associated with the forecast (block 690). For example, the device may perform an action associated with the forecast, as described above. In some implementations, performing the action comprises at least one of: sending the forecast to an additional device to allow the additional device to display the forecast on a display of the additional device.

In some implementations, performing the action includes determining a value of the transaction based on at least one of: previous transaction is valuing of the set of previous transactions, or a pending transaction is valuing associated with a pending transaction, wherein the action is performed based on the time period and the value.

In some implementations, performing the action includes providing information that identifies the time period and the value to permit resources, associated with the value, to be available to enable the transaction to occur during the time period. In some implementations, performing the action includes allocating resources to permit the transaction to occur during the time period, wherein a quantity of the resources is being based on the value.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
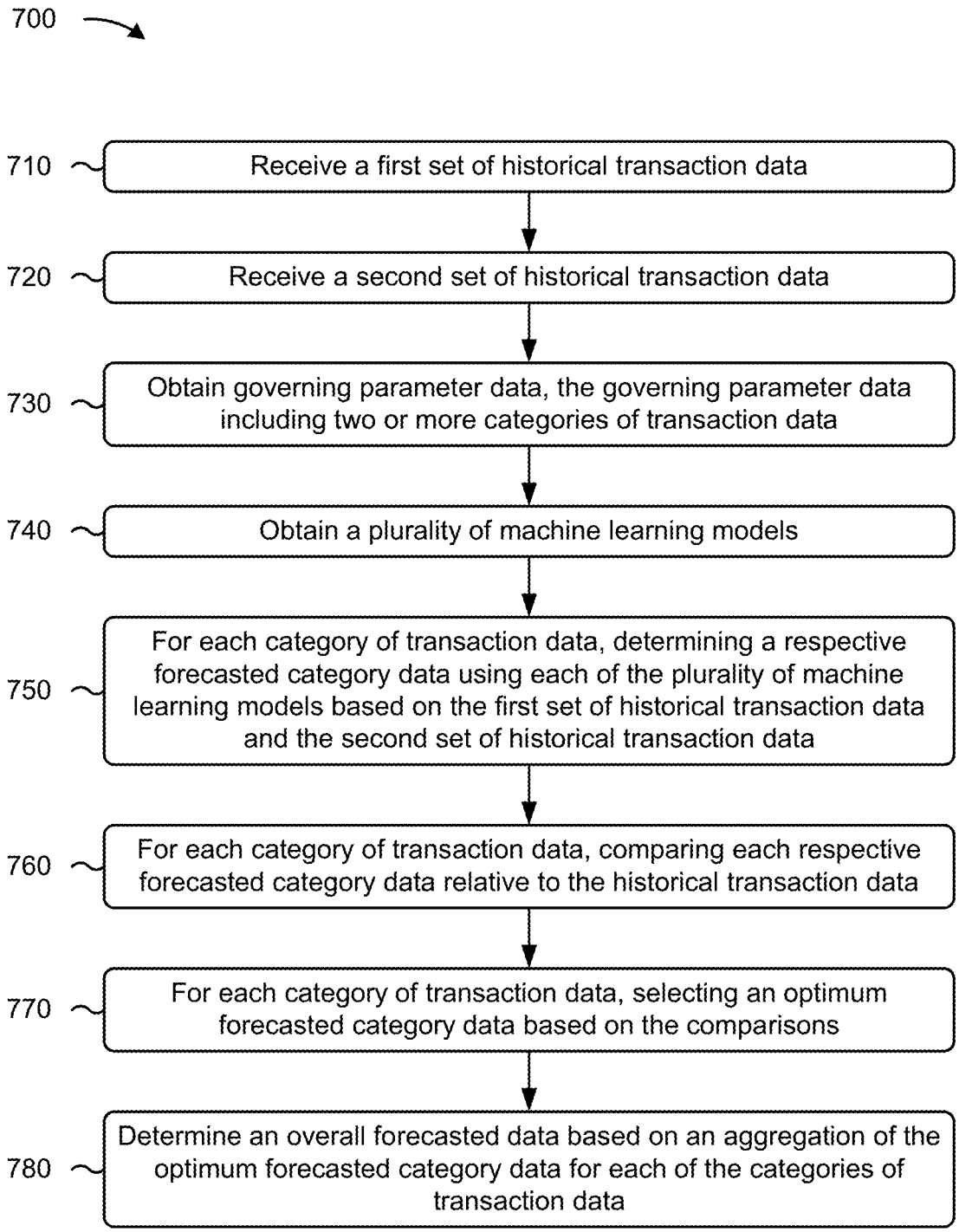

FIG. 7 is a flowchart of an example process 700 associated with generating a forecast based on multiple time dimensions and machine learning techniques. In some implementations, one or more process blocks of FIG. 7 may be performed by a device (e.g., transaction forecast system 401). In some implementations, one or more process blocks of FIG. 7 may be performed by another device or a group of devices separate from or including the device, such as a transaction data source (e.g., transaction data source 430). Additionally, or alternatively, one or more process blocks of FIG. 7 may be performed by one or more components of device 500, such as processor 520, memory 530, storage component 540, input component 550, output component 560, and/or communication component 570.

As shown in FIG. 7, process 700 may include receiving a first set of historical transaction data (block 710). For example, the device may receive a first set of historical transaction data, as described above.

As further shown in FIG. 7, process 700 may include receiving a second set of historical transaction data (block 720). For example, the device may receive a second set of historical transaction data, as described above. In some implementations, the device may convert the first set of historical transaction data and the second set of historical transaction data into a normalized format.

As further shown in FIG. 7, process 700 may include obtaining governing parameter data, the governing parameter data including two or more categories of transaction data (block 730). For example, the device may obtain governing parameter data, the governing parameter data including two or more categories of transaction data, as described above. In some implementations, the device may receive user selection data and may determining the governing parameter based on the user selection data.

As further shown in FIG. 7, process 700 may include obtaining a plurality of machine learning models (block 740). For example, the device may obtain a plurality of machine learning models, as described above.

As further shown in FIG. 7, process 700 may include, for each category of transaction data, determining a respective forecasted category data using each of the plurality of machine learning models based on the first set of historical transaction data and the second set of historical transaction data (block 750). For example, the device may, for each category of transaction data, determine a respective forecasted category data using each of the plurality of machine learning models based on the first set of historical transaction data and the second set of historical transaction data, as described above.

As further shown in FIG. 7, process 700 may include, for each category of transaction data, comparing each respective forecasted category data relative to the historical transaction data (block 760). For example, the device may, for each category of transaction data, compare each respective forecasted category data relative to the historical transaction data, as described above.

As further shown in FIG. 7, process 700 may include, for each category of transaction data, selecting an optimum forecasted category data based on the comparisons (block 770). For example, the device may, for each category of transaction data, select an optimum forecasted category data based on the comparisons, as described above.

As further shown in FIG. 7, process 700 may include determining an overall forecasted data based on an aggregation of the optimum forecasted category data for each of the categories of transaction data (block 780). For example, the device may determine an overall forecasted data based on an aggregation of the optimum forecasted category data for each of the categories of transaction data, as described above. In some implementations, the device may receive a time parameter. The device may determine an aggregation score based on the time parameter and may determine the overall forecasted data based on a weighted aggregation of the optimum forecasted category data for each of the categories of transaction data using the aggregation score.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   configuring, by a device, a plurality of time dimensions of a forecast model to forecast transactions;
   training, by the device, the forecast model based on historical data associated with a plurality of previous transactions,
   wherein training the forecast model comprises:
      generating a set of machine learning models to generate transaction forecasts;
      dividing the historical data into a first portion of historical data associated with a first period of time and a second portion of historical data associated with a second period of time,
      training the set of machine learning models based on the first portion of historical data,
      generating one or more initial transaction forecasts based on a set of different time dimensions,
      generating one or more evaluation scores based on the one or more initial transaction forecasts and the second portion of historical data using an error processing technique, and
      selecting a machine learning model, of the set of machine learning models,
   as the forecast model based on the one or more evaluation scores;
   receiving, by the device, transaction information associated with forecasting a transaction;
   identifying, by the device and using the forecast model and the transaction information, historical transaction data in the historical data that is associated with the transaction, wherein the historical transaction data includes timing information associated with executions of a set of previous transactions, of the plurality of previous transactions, that are associated with the transaction;
   generating, by the device and using the forecast model and the plurality of time dimensions, a plurality of clusters associated with the set of previous transactions based on the timing information;
   utilizing, by the device and using the forecast model, a modified k-means algorithm to classify a new observation associated with the transaction into a cluster of the plurality of clusters,
      wherein the modified k-means algorithm clusters one or more transactions based on the plurality of time dimensions;
   determining, by the device and using the forecast model, similarity scores for the plurality of clusters that correspond to individual probabilities that the set of previous transactions occurred according to the plurality of time dimensions;

selecting, by the device and based on the similarity scores, a time dimension, of the plurality of time dimensions, for a forecast of the transaction, wherein the time dimension is associated with a highest probability that the set of previous transactions occurred according to the time dimension;

generating, by the device, the forecast of the transaction based on the time dimension,
  wherein generating the forecast comprises:
    performing a low-latency run process to generate the forecast;

retraining, by the device, the forecast model to improve an accuracy of the forecast model using the forecast; and performing, by the device, an action associated with the forecast.

2. The method of claim 1, wherein the transaction information indicates that the transaction is a recurrent transaction,
  wherein the historical transaction data is identified based on analyzing the historical data to identify the set of previous transactions based on the transaction being the recurrent transaction.

3. The method of claim 1, wherein the transaction information is received in association with a user input,
  wherein the user input identifies a forecast period associated with the transaction, and
  wherein the time dimension is selected based on the forecast period.

4. The method of claim 1, wherein generating the plurality of clusters comprises:
  identifying, from the timing information, execution dates of the executions of the set of previous transactions;
  determining, according to a calendar system, date characteristics of the execution dates; and
  mapping, based on the date characteristics, the executions of the set of previous transactions to the date characteristics and corresponding time parameters of the plurality of time dimensions,
    wherein the plurality of clusters are associated with quantities of the set of previous transactions occurring according to the corresponding time parameters.

5. The method of claim 1, wherein generating the forecast comprises:
  determining timing of the forecast based on the time dimension;
  determining a value of the transaction based on at least one of:
    previous transaction values of the set of previous transactions, or
    a pending transaction value associated with a pending transaction; and
  generating the forecast to include the timing and the value.

6. The method of claim 1, wherein performing the action comprises at least one of:
  sending the forecast to an additional device to allow the additional device to display the forecast on a display of the additional device;
  generating, based on the forecast, analysis data that is associated with a similarity score associated with the time dimension;
  sending the analysis data to the additional device to allow the additional device to display the analysis data on the display of the additional device;
  retraining a machine learning model based on the similarity score associated with the time dimension; or
  designating resources to facilitate the transaction.

7. The method of claim 1, wherein the plurality of time dimensions comprise various time periods associated with potential recurrences of the transaction.

8. A device, comprising:
one or more memories; and
one or more processors, communicatively coupled to the one or more memories, configured to:
  receive transaction information associated with forecasting a transaction;
  determine, based on the transaction information, a forecast period associated with the transaction,
    wherein the one or more processors, to determine the forecast period, are configured to:
      generate a set of machine learning models to generate transaction forecasts,
      divide historical data into a first portion of historical data associated with a first period of time and a second portion of historical data associated with a second period of time,
      train the set of machine learning models based on the first portion of historical data,
      generate one or more initial transaction forecasts based on a set of different time dimensions,
      generate one or more evaluation scores based on the one or more initial transaction forecasts and the second portion of historical data using an error processing technique,
      select a machine learning model, of the set of machine learning models, based on the one or more evaluation scores, and
      determine the forecast period based on selecting the machine learning model;
  select, based on the forecast period and from a plurality of time dimensions, a set of time dimensions for forecasting timing of the transaction;
  identify historical transaction data associated with a set of previous transactions that are associated with the transaction;
  generate, according to the set of time dimensions, a plurality of clusters associated with the set of previous transactions based on timing of the set of previous transactions in the historical transaction data;
  utilize, using a forecast model, a modified k-means algorithm to classify a new observation associated with the transaction into a cluster of the plurality of clusters,
    wherein the modified k-means algorithm clusters transactions based on the plurality of time dimensions;
  perform a similarity analysis on one or more of the plurality of clusters;
  select, based on performing the similarity analysis, a time dimension from the set of time dimensions,
    wherein the similarity analysis indicates that a cluster associated with the time dimension indicates that the time dimension provides a highest probability of being accurate relative to other time dimensions of the set of time dimensions;
  determine, based on the time dimension, a time period of the transaction;
  retrain the forecast model based on the transaction to improve an accuracy of the forecast model; and
  perform an action associated with the time period.

9. The device of claim 8, wherein the transaction information indicates that the transaction is a recurrent transaction, and wherein the historical transaction data is obtained based on being a recurrent transaction.

10. The device of claim 8, wherein the one or more processors, when obtaining the historical transaction data, are configured to:
identify, based on the transaction information, a characteristic of the transaction;
analyze historical data that includes the historical transaction data to identify the set of previous transactions based on the characteristic; and
extract the historic transaction data based on the set of previous transactions being associated with the characteristic.

11. The device of claim 8, wherein the one or more processors, when generating the plurality of clusters, are configured to:
identify, from the historical transaction data, execution dates of executions of the set of previous transactions;
determine, according to a calendar system, date characteristics of the execution dates; and
map, based on the date characteristics, the executions of the set of previous transactions to the date characteristics and corresponding time parameters of the set of time dimensions,
wherein the plurality of clusters are associated with quantities of the set of previous transactions occurring according to the corresponding time parameters.

12. The device of claim 8, wherein the one or more processors are further configured to:
determine a value of the transaction based on at least one of:
previous transaction values of the set of previous transactions, or
a pending transaction value associated with a pending transaction,
wherein the action is performed based on the time period and the value.

13. The device of claim 12, wherein the one or more processors, when performing the action, are configured to:
provide information that identifies the time period and the value to permit resources, associated with the value, to be available to enable the transaction to occur during the time period.

14. The device of claim 12, wherein the one or more processors, when performing the action, are configured to:
allocate resources to permit the transaction to occur during the time period,
wherein a quantity of the resources is based on the value.

15. A non-transitory computer-readable medium storing instructions, the instructions comprising:
one or more instructions that, when executed by one or more processors, cause the one or more processors to:
configure a forecast model to utilize a plurality of time dimensions to forecast transactions;
train the forecast model based on the plurality of time dimensions and historical data associated with a plurality of previous transactions,
wherein the one or more processors, to train the forecast model, are configured to:
generate a set of machine learning models to generate transaction forecasts,
divide historical data into a first portion of historical data associated with a first period of time and a second portion of historical data associated with a second period of time,
train the set of machine learning models based on the first portion of historical data,
generate one or more initial transaction forecasts based on a set of different time dimensions,
generate one or more evaluation scores based on the one or more initial transaction forecasts and the second portion of historical data using an error processing technique, and
select a machine learning model, of the set of machine learning models, as the forecast model based on the one or more evaluation scores;
evaluate a plurality of clusters associated with the forecast model forecasting a transaction according to the plurality of time dimensions,
wherein the transaction is associated with a particular characteristic, and
wherein the transaction is associated with a set of previous transactions of the plurality of previous transactions that are associated with the particular characteristic;
utilize, using the forecast model, a modified k-means algorithm to classify a new observation associated with the transaction into a cluster of the plurality of clusters,
wherein the modified k-means algorithm clusters transactions based on the plurality of time dimensions;
select an optimum time dimension, from the plurality of time dimensions, based on a comparison of respective cluster scores of the plurality of time dimensions that are relative to evaluating the plurality of clusters;
retrain the forecast model based on the transaction to improve an accuracy of the forecast model; and
perform an action associated with the forecast model forecasting timing of the transaction according to the optimum time dimension.

16. The non-transitory computer-readable medium of claim 15, wherein the one or more instructions, when executed by one or more processors, further cause the one or more processors to:
receive a forecast request associated with the transaction, wherein the forecast request identifies the transaction by identifying the characteristic;
select, based on the request identifying the characteristic, the forecast model from a plurality of forecast models; and
cause the forecast model to forecast the timing of the transaction based on the optimum time dimension.

17. The non-transitory computer-readable medium of claim 15,
wherein the one or more instructions, that cause the one or more processors to train the forecast model, cause the one or more processors to:
train the forecast model based on timing information associated with executions of the plurality of previous transactions, time parameters of the plurality of time dimensions, and transaction information associated with the plurality of previous transactions.

18. The non-transitory computer-readable medium of claim 15,
wherein the one or more instructions, that cause the one or more processors to evaluate the plurality of clusters, cause the one or more processors to:
determine the respective cluster scores for the plurality of time dimensions based on a similarity of respective cluster data of the plurality of clusters.

19. The non-transitory computer-readable medium of claim 15, wherein the one or more instructions, that cause the one or more processors to perform the action, cause the one or more processors to:
configure the forecast model to use the optimum time dimension to forecast the timing of the transaction when a request to forecast the timing of the transaction is received.

20. The non-transitory computer-readable medium of claim 15, wherein the characteristic comprises at least one of:
a type of the transaction;
a value of the transaction;
a party of the transaction; or
a recurrence characteristic of the transaction.

21. A method, comprising:
receiving, by a device, a first set of historical transaction data;
receiving, by the device, a second set of historical transaction data;
obtaining, by the device, governing parameter data, the governing parameter data including two or more categories of transaction data;
generating, by the device, a plurality of machine learning models;
for each category of transaction data, determining, by the device, a respective forecasted category data using each of the plurality of machine learning models based on the first set of historical transaction data and the second set of historical transaction data;
for each category of transaction data, comparing, by the device, each respective forecasted category data relative to the historical transaction data;
for each category of transaction data, selecting, by the device, optimum forecasted category data based on the comparison for each category of transaction data;
generating one or more accuracy scores based on comparing each respective forecasted category data relative to the historical transaction data;
selecting a set of machine learning models, from the plurality of machine learning models, based on the one or more accuracy scores;
evaluating, by the device, a plurality of clusters associated with the set of machine learning models forecasting a transaction according to a plurality of time dimensions;
utilizing, by the device and using the set of machine learning models, a modified k-means algorithm to classify a new observation associated with the transaction into a cluster of the plurality of clusters,
wherein the modified k-means algorithm clusters transactions based on the plurality of time dimensions;
retraining, by the device, the set of machine learning models based on the transaction to improve an accuracy of the set of machine learning models; and
determining, by the device, overall forecasted data based on an aggregation of the optimum forecasted category data for each of the categories of transaction data.

22. The method of claim 21, further comprising:
converting the first set of historical transaction data and the second set of historical transaction data into a normalized format.

23. The method of claim 21, further comprising:
receiving user selection data; and
determining the governing parameter data based on the user selection data.

24. The method of claim 21, further comprising:
receiving a time parameter,
determining an aggregation score based on the time parameter, and
determining the overall forecasted data based on a weighted aggregation of the optimum forecasted category data for each of the categories of transaction data using the aggregation score.

* * * * *

UNITED STATES PATENT AND TRADEMARK OFFICE
CERTIFICATE OF CORRECTION

PATENT NO. : 12,045,751 B2
APPLICATION NO. : 17/448987
DATED : July 23, 2024
INVENTOR(S) : Marcus Martinnson and Pau Ferrer Puig Page 1 of 1

It is certified that error appears in the above-identified patent and that said Letters Patent is hereby corrected as shown below:

In the Claims

In Claim 10, Column 27, Line 11, delete "historic" and insert -- historical -- between "extract the" and "transaction".

Signed and Sealed this
Twenty-fourth Day of December, 2024

Derrick Brent
*Acting Director of the United States Patent and Trademark Office*